United States Patent [19]

Möbius

[11] Patent Number: 4,590,359
[45] Date of Patent: May 20, 1986

[54] HEATING FOR A CAR SEAT

[76] Inventor: Ulrich Möbius, 45, Fraunhoferstrasse, D-6450 Hanau/Main, Fed. Rep. of Germany

[21] Appl. No.: 604,086

[22] Filed: Apr. 26, 1984

[51] Int. Cl.⁴ ............................................. H05B 1/00
[52] U.S. Cl. .................................. 219/217; 219/529; 219/202
[58] Field of Search ............... 219/217, 528, 529, 211, 219/212, 548, 549, 202

[56] References Cited

U.S. PATENT DOCUMENTS

| | | | |
|---|---|---|---|
| 840,857 | 1/1907 | Matcovitch | 219/212 |
| 1,375,863 | 4/1921 | Stanton | 219/212 |
| 2,255,376 | 9/1941 | Bull | 219/528 |
| 2,376,902 | 5/1945 | Clark | 219/217 |
| 2,731,542 | 1/1956 | Daniels | 219/217 |
| 2,769,892 | 11/1956 | Collins | 219/528 |
| 2,782,289 | 2/1957 | Nathanson | 219/217 |
| 3,017,493 | 1/1962 | Cooke | 219/217 |
| 3,130,289 | 4/1964 | Katzman | 219/528 |
| 3,400,254 | 9/1968 | Takemori | 219/528 |
| 4,044,221 | 8/1977 | Kuhn | 219/528 |

FOREIGN PATENT DOCUMENTS

| | | | |
|---|---|---|---|
| 844198 | 7/1952 | Fed. Rep. of Germany | 219/211 |
| 2110632 | 9/1972 | Fed. Rep. of Germany | 219/202 |
| 2203678 | 8/1973 | Fed. Rep. of Germany | 219/202 |

Primary Examiner—C. L. Albritton
Assistant Examiner—Teresa J. Walberg
Attorney, Agent, or Firm—Jordan B. Bierman

[57] ABSTRACT

A heater for a car seat including a base and a back rest, the heater having at least one heating coil adjusted for connection to a power source and including a multi-ply fabric with at least one outer protective layer of union, a second layer and a third layer with a low thermal transfer value, the heating coil being arranged in and laminated with the second layer and being arranged in one plane in zigzag on a circle to form a star shaped configuration, the heater being a unit in the form of a seat cover detachably encasing the base and back rest.

10 Claims, 3 Drawing Figures

U.S. Patent  May 20, 1986  4,590,359
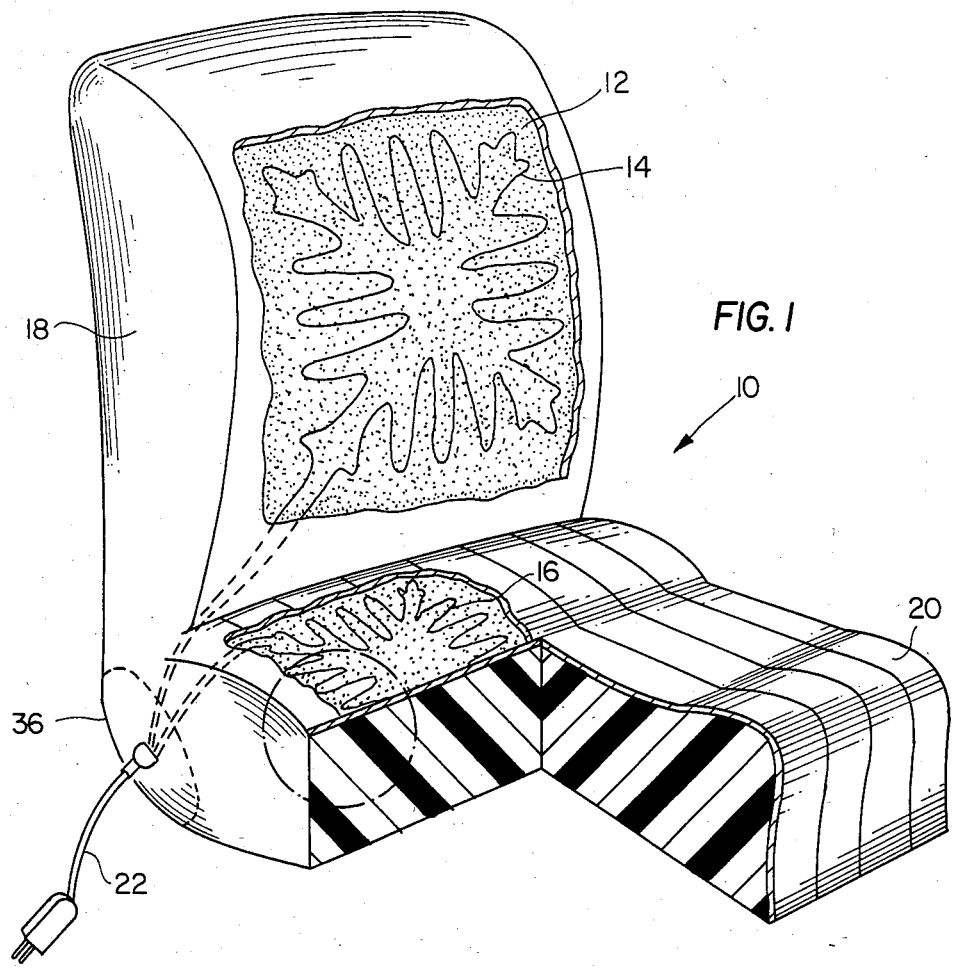
FIG. 1
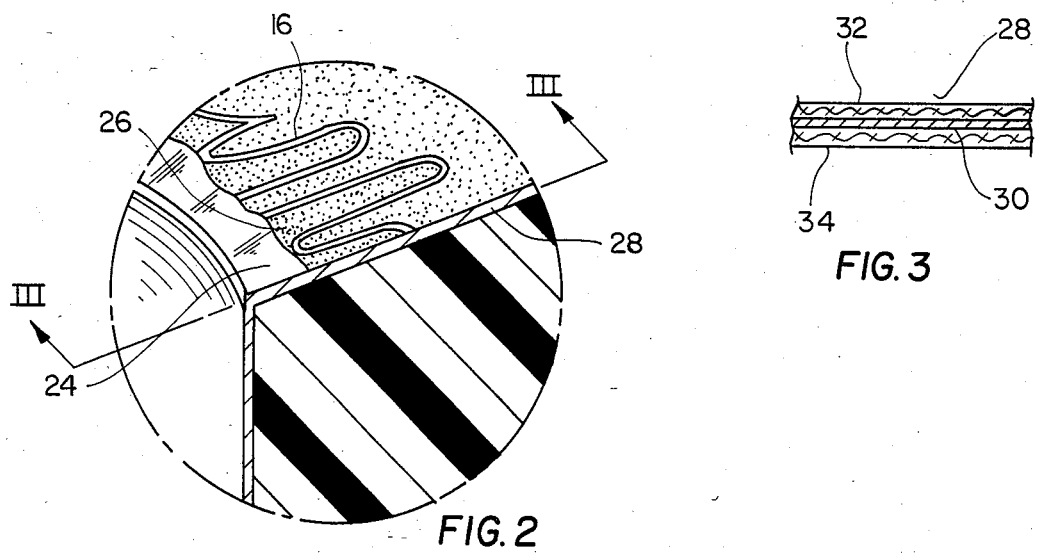
FIG. 2
FIG. 3

HEATING FOR A CAR SEAT

The invention relates to a heating unit for a car seat having heating wires that can be connected to a source of power.

Especially in the cold season it is desirable that the seat of a motor vehicle can be heated. Thus there are known electrically heated seat overlays like seat cushions, which are arranged between the driver's seat and a seat cover that can be pulled over this seat. However, such seat cushions constitute a foreign body having a negative effect on the seating comfort. Besides such cushions can easily slip out of place and crumple so that they will not give off the heat in the desired areas. As an alternative one has heating systems integrally mounted in seats which, however, on principle are only obtainable by buying a new car.

It is now an object of the invention to develop a heating unit for a car seat in such a manner that it guarantees an optimum heat emission with a simple construction, and especially eliminates losses of heat into the seat without having any influence on the seating comfort itself. Likewise it shall be possible to subsequently equip the car seats with such a heating unit.

This problem is solved in that at least parts of the car seat are provided with a covering of a multi-ply fabric, having at least three plies. Thereby an outer ply is made of union in order to, among others, absorb humidity and to let the heat pass through easily. A following second ply comprises the heating wires, which e.g. are connected to the automobile battery. A preferably suitable material for the second ply is a not easily inflammable gauze. A third ply serves as a heat reflector and guarantees that the heat emitted by the heating wires is given off to the outside—to the driver or the passenger and not into the car seat. Hereby the third ply preferably has a foil of aluminum, which at least on one surface is covered by a layer of synthetic material or mixed fabric. In this case a back side layer can be made of terrycloth material. This will be advantageous especially then if the multiply fabric is designed as a protective covering and is used as a turning cover. The heating wires are arranged in the area of the seat and the backrest, or in sections thereof in zigzag on a circular plane. By the arrangement of the heating wires on one level, an area heating is provided radiating the heat at a desired extent to the seating and/or backrest part of the user.

By the radial arrangement of the heating wires it is guaranteed that the fabric ply comprising the heating wires can be stretched or displaced in any direction whatsoever without risking a breaking of the heating wire; for by the zigzag-shaped or meander-shaped turns of the heating coil being arranged in one and the same plane, there is always an adaption in direction of the elongation, in that the turns are lengthened or the distance to each other is reduced (weight and area adaption).

The definite positioning of the heating coils in the backrest or seat area is guaranteed thereby that these coils are covered on both sides by fabric plies. Therefore the coils themselves are laminated with the fabric supports. The middle ply with the heating wires is freely movable relative to the adjacent fabric layers, and is sewn up with the other layers only via the marginal areas. This results in a free movability which, in addition, guarantees that a breaking of the heating wires cannot take place irrespective of the area or weight load. The heating coils themselves should be stranded so as to provide a high flexibility. Preferably the heating coils, via a plug-in connector like an unscrewing terminal, are connected to an additional electric conductor, which can be connected directly or indirectly to an automobile battery. This can be effected, via a cigarette lighter.

In order to further guarantee that the plug connection cannot be uncontrollably interrupted, this connection can be lodged in a pocket provided in the seat cover, and that in the transition area between backrest and seat.

Further details, advantages and characteristics of the present invention will be apparent upon consideration of the following detailed description of a preferred embodiment thereof in conjunction with the annexed drawings wherein:

FIG. 1 is a perspective view of a car seat with a seat cover, partially broken away, FIG. 2 shows an enlarged section of the seat cover according to FIG. 1, and FIG. 3 is a sectional view of the lower layer of the cover taken along the line III—III in FIG. 2.

FIG. 1 is a perspective view of a car seat 10, which itself can be made of composite parts. In this case the car seat is not a one-piece construction with respect to the backrest or the seating range. In this embodiment example the car seat is provided with a seat cover 12. As integral components of this seat cover 12, heating coils 14 or 16 are placed therein, being arranged in the area of the backrest 18 or the seat 20 or parts thereof. The heating coils 14 and 16 can be connected directly or indirectly to a source of power, like an automobile battery, via an electric connection 22. Thereby a time switch (not shown) can be arranged in the electric feeding line, by which the heating is switched on at a desired time. The time switch can be mounted at the inner edge of the backrest of the passenger's seat by means of a bur-catch, in order to be able to see by means of an optic signal emitted by the time switch, from the side of the driver's door whether the time switch is switched on or not.

Further a three-step switch can be provided, by which optionally the seating surface and/or the backrest can be heated to the desired extent.

The seat cover 12 presents a multiply fabric arrangement. In the embodiment example the seat cover has a total of three main layers. Thus there is an outer protective or covering layer 24, being made of union so that its natural fibers can absorb moisture. The first layer 24 is followed by a second layer 26, on which the heating coils 16 are concealed. The layer 26 can be made of difficultly inflammable gauze. Finally as a lower third layer follows the heat-reflecting layer 28, which guarantees that the heat given off by the heating coils 14 or 16 is not led into the seat but rather to the outside. To this end the layer 28 can have a core 30, being made of aluminum foil and encased on both sides by layers 32 or 34, which in their turn can be made of synthetic material or a terry cloth. Thereby the reverse layer 32 is preferably a mixed fabric or a cover of union that can be terry cloth. This configuration offers the advantage that the seat cover, so far as it is used as a turnover cover, after having been turned does likewise have an outside layer absorbing the moisture.

Concerning the layer 26 it must be noted that it really is composed of two layers between which the heating coils 14 or 16 are concealed. Further the layer 26 is connected with the adjacent layers 24 and 28 only in its marginal area (by sewing) in order to obtain a free movability in this manner.

Finally special attention should be drawn to the arrangement of the heating coils 14 and 16. These are being arranged in one plane and extending in zigzag, thus resulting in an almost star-shaped configuration. This is explicitly shown in the drawing according to FIG. 1. There, for obtaining a homogeneous heating surface, a large number of the points of the heating wire turns is arranged on the circumference of a rectangle or a square being adapted to the section to be covered of the car seat 10. Of course, as an alternative one can also use a circular form or oval form.

The advantage of such an arrangement of the heating wires is to be seen therein that the heating coils 14 or 16 react to a pressure action, thus depending on the pressure being exercised, they will be lengthened or, shortened. In this manner an overstressing and thus a breaking is eliminated.

Consequently according to the suggestion of the invention a seat is provided, being encased by a multiply fabric in thermo-sandwich design as covering, preferably shaped like a seat cover, and by which it is guaranteed that an optimum heat application to the driver or passenger can take place. A supercooling of the muscles of the driver in the cold season is avoided as well as inflammation of the urinary tract in even colder weather. Thereby the seat heating unit itself is of uncomplicated construction, can be easily mounted without causing any problems and besides can be connected to the car battery via a cigarette lighter.

I claim:

1. A heater for a car seat including a base and a back rest, said heater having at least one heating coil adapted to be connected to a source of power, said heater comprising a multi-ply fabric with at least an outer protective layer of union, a second layer, and a third layer with a low thermal transfer value; said heating coil being arranged in and laminated with said second layer, said heating coil being arranged in one plane in zigzag on a circle to obtain a star shaped-configuration, and said heater being a unit in form of a seat cover detachably encasing said base and said back rest.

2. The heater according to claim 1 wherein said heating coils in said second layer are covered on both sides by difficulty inflammable gauze.

3. The heater according to claim 1 wherein said cover is reversible.

4. The heater according to claim 1 wherein said third layer is a heat-reflecting fabric.

5. The heater according to claim 1, wherein said third layer comprises a heat-reflecting foil.

6. The heater according to claim 5 wherein said heat-reflecting foil is an aluminum foil, coated on at least one side with synthetic material.

7. The heater according to claim 5 wherein said foil is perforated.

8. The heater according to claim 1 wherein an outer surface of said third layer is terrycloth.

9. The heater according to claim 1 wherein said heating coils are connected to said power source by a cable and a plug connector.

10. The heater according to claim 9 wherein said plug connector is located in a pocket incorporated in said protective layer between said back rest and said base.

* * * * *